(12) United States Patent
Nawae et al.

(10) Patent No.: US 7,376,312 B2
(45) Date of Patent: May 20, 2008

(54) OPTICAL MODULE AND METHOD FOR MANUFACTURING THE SAME

(75) Inventors: Shuichi Nawae, Kyoto (JP); Jun Ichihara, Kyoto (JP)

(73) Assignee: Rohm Co., Ltd., Kyoto-shi (JP)

( * ) Notice: Subject to any disclaimer, the term of this patent is extended or adjusted under 35 U.S.C. 154(b) by 938 days.

(21) Appl. No.: 10/700,457

(22) Filed: Nov. 5, 2003

(65) Prior Publication Data

US 2004/0091217 A1    May 13, 2004

(30) Foreign Application Priority Data

Nov. 5, 2002   (JP) .............................. 2002-320722
Dec. 3, 2002   (JP) .............................. 2002-350826

(51) Int. Cl.
    *G02B 6/30*   (2006.01)
(52) U.S. Cl. ............................ 385/49; 385/14; 385/52; 385/53; 385/65; 385/88; 385/89; 385/90; 385/139
(58) Field of Classification Search .................... 385/49
    See application file for complete search history.

(56) References Cited

U.S. PATENT DOCUMENTS

| 5,110,065 | A | 5/1992 | Cawelti et al. |
| 2002/0015560 | A1* | 2/2002 | De Donno et al. ............ 385/38 |
| 2003/0035634 | A1* | 2/2003 | Shimada et al. .............. 385/88 |
| 2003/0048997 | A1* | 3/2003 | Nobuhara et al. ............ 385/84 |
| 2006/0284294 | A1* | 12/2006 | Sherrer et al. .............. 257/678 |

FOREIGN PATENT DOCUMENTS

| JP | 63-085507 | 4/1988 |
| JP | 63-161408 | 7/1988 |
| JP | 02-277010 | 11/1990 |
| JP | 04-120783 | 4/1992 |
| JP | 05-092867 | 4/1993 |
| JP | 06-281846 | 10/1994 |
| JP | 07-333472 | 12/1995 |
| JP | 09-090177 | 4/1997 |
| JP | 2001-201670 | 7/2001 |
| JP | 2001-215365 | 8/2001 |

* cited by examiner

Primary Examiner—Frank G. Font
Assistant Examiner—Mary El-Shammaa
(74) Attorney, Agent, or Firm—Rabin & Berdo, PC

(57) ABSTRACT

An optical element and an optical transmission member are fixedly secured onto a substrate so as to be coupled to each other. In this substrate, a through hole is formed between an optical element secured portion and an optical transmission member secured portion. In an attempt to assemble these optical transmission member and optical element so as to make the coupling at an optimal position, first, the position of the optical transmission member is adjusted to an optimal position, and after measuring the position by a laser micrometer, the optical transmission member is fixedly secured thereto by using a soldering material. Thus, measurements are again carried out by the laser micrometer to detect an amount of deviation from the measured value before the securing process, and the secured portion is again fused so that the optical transmission member is shifted based on the amount of deviation, and again fixedly secured thereon.

9 Claims, 8 Drawing Sheets

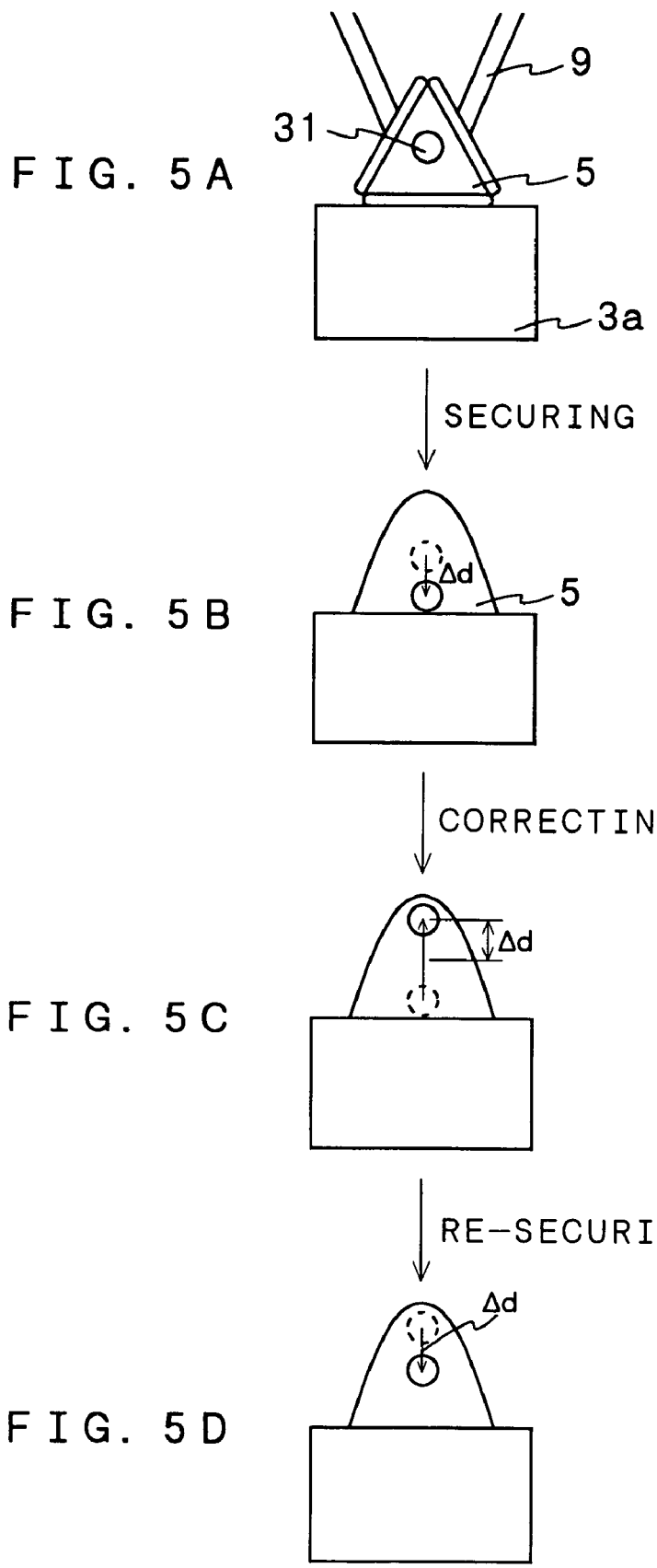

FIG. 7A
FIG. 7B
SECURING
FIG. 8
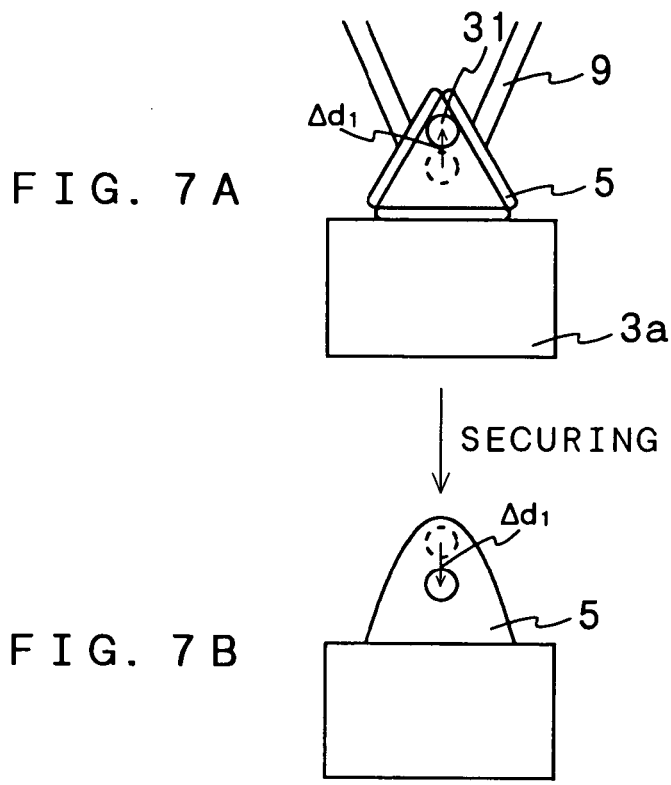
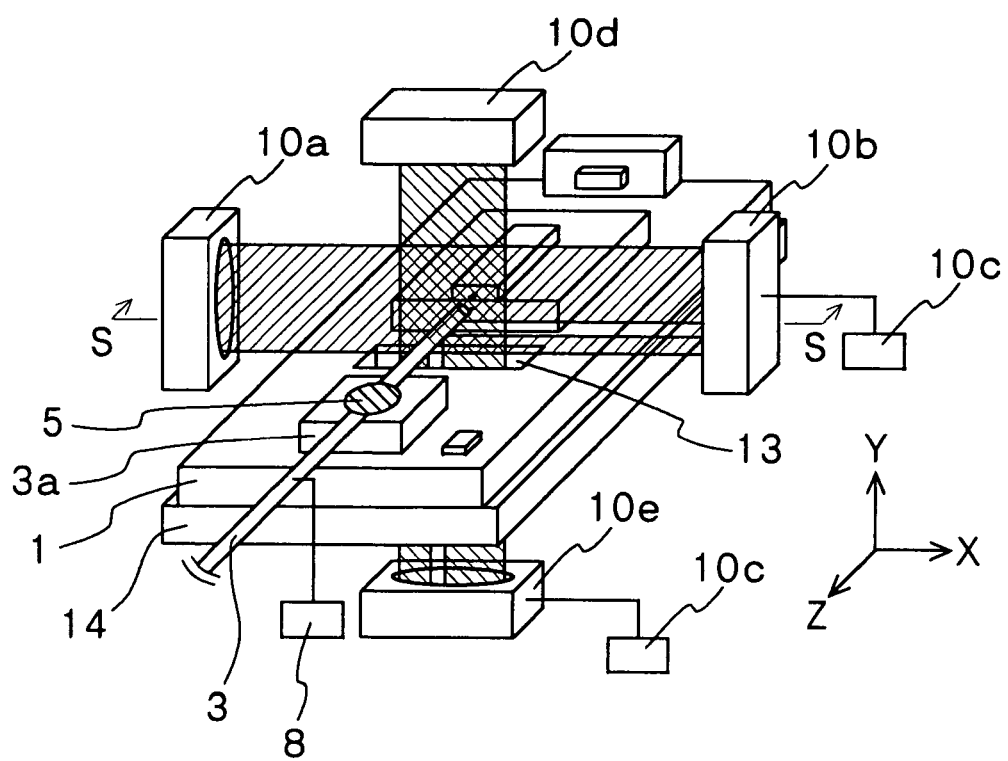

LIGHT INTENSITY DISTRIBUTION

LIGHT INTENSITY DISTRIBUTION

OPTICAL MODULE AND METHOD FOR MANUFACTURING THE SAME

FIELD OF THE INVENTION

The present invention relates to an optical module in which an optical element and an optical transmission member are assembled and a manufacturing method thereof. More specifically, the present invention relates to an optical module in which the optical element and the optical transmission member are aligned in an appropriate positional relationship with high precision to provide high reliability and high yield, and a manufacturing method thereof.

BACKGROUND OF THE INVENTION

With respect to an EDFA (Erbium-Doped Fiber Amplifier) or the like which is used for, for example, a relay point in a main-line transmission path, and amplifies a signal, an optical module having a semiconductor laser and an optical fiber assembled therein is used as an exciting light source. The optical module of this type has a structure shown in FIG. 11A. In other words, a substrate 1 is placed on a Peltier element 12 in a box member 11, and a semiconductor laser chip 21 is fixedly secured to the substrate 1 through a sub-mount 7, an optical fiber 31 is fixedly secured thereto through an optical transmission member securing base 3a, a light receiving element 6 is fixedly secured to the substrate 1 through a light receiving element securing base 6a. Here, the optical transmission member securing base 3a and the optical fiber 31 are secured to each other by using a soldering material 5 or through a YAG welding process or the like (for example, see JP-A No. 7-333472).

In the optical module of this type, there have been demands for increasing the coupling efficiency between the semiconductor laser chip 21 and the optical fiber 31 to not less than 80% in order to reduce the load imposed on the semiconductor laser chip 21. In an attempt to achieve this value, the positional precision of the optical fiber 31 with respect to the semiconductor laser chip 21 needs to be set to approximately not more than ±0.2 µm. In the assembling process between these semiconductor laser chip and optical fiber, for example, as shown in FIG. 11B, the positioning between these members is carried out while detecting the output of the optical fiber 31 by a light output measuring device 41 so that these members are secured to each other through welding by a YAG laser or soldering.

Additionally, with respect to this positioning process, another method has been proposed in which image-pickup cameras are used for observing the positional relationship between the semiconductor laser chip 21 and the optical fiber 31 by picking up images in two directions from the upper face side and the side face side that is orthogonal to this side of the semiconductor laser chip 21 so that the positioning process is carried out by using photographic images (for example, see JP-A No. 6-281846 (FIG. 1)).

However, in the case when, after the positioning process using these methods, an optical transmission member such as an optical fiber is secured, a positional deviation actually occurs during the securing process. For this reason, it is necessary to correct the positional deviation during the securing process. However, for example, in the case of the securing process through welding by a YAG laser, there occurs a great positional deviation during the securing process, and little correction is made. Additionally, since the correction of the amount of deviation cannot be carried out quantitatively, the amount of deviation after the securing process reaches approximately 0.7 µm in average, as shown in FIG. 11C, resulting in a serious reduction in the yield. Moreover, since the correction process is carried out by preparing an increased number of welding points and by pulling toward the points, the number of corrections is limited to several times.

In contrast, in the case when the securing process is carried out by using a soldering material or the like, although the corrections can be carried out a desired number of times, the deviation direction of the optical fiber and the absolute amount of deviation are not recognized, with the result that, in spite of a number of corrections with high costs, it is not possible to carry out a complete positioning process.

Moreover, in the case when the securing process of the optical fiber is carried out through soldering, although this method is advantageous in that upon occurrence of a positional deviation, the correction is easily carried out by again fusing the soldering material, the application of the soldering material causes the possibility that heat, generated upon fusing the soldering material at the time of securing the optical fiber, is transmitted to the semiconductor laser chip to cause degradation in the characteristics of the semiconductor laser chip.

SUMMARY OF THE INVENTION

The present invention has been derived to solve the above-mentioned problems, and an object of the present invention is to provide an optical module in which the optical element and the optical transmission member are aligned in an appropriate positional relationship with high precision without causing any degradation in the optical element. Thus, the present invention provides high reliability in the optical element or the like with high coupling efficiency.

Another object of the present invention is to provide a manufacturing method for an optical module, which aligns the optical element and the optical transmission member in an appropriate positional relationship with high precision, and reliably provides a high coupling efficiency in a short time.

An optical module of the present invention includes; a substrate, an optical element that is fixedly secured to the substrate, and an optical transmission member that is coupled to the optical element and fixedly secured on the substrate, wherein the substrate is made of a substrate having a through hole between a secured portion of the optical element and a secured portion of the optical transmission member.

Moreover, a manufacturing method for an optical module of the present invention, in which an optical transmission member is fixedly secured on a substrate provided with an optical element so that the optical transmission member is coupled to the optical element, comprising the steps of; (a) shifting the above-mentioned optical transmission member by using a driving mechanism to position-adjust the optical transmission member so as to be coupled to the above-mentioned optical element at an optimal position, (b) measuring the position, in Y-direction that is a direction orthogonal to the surface of the above-mentioned substrate, of the optical transmission member that has been position-adjusted, by using a laser micrometer, (c) fixedly securing the above-mentioned optical transmission member onto the substrate through a soldering material, (d) measuring the position in the Y-direction of the optical transmission member by using the laser micrometer so as to detect an amount of deviation from the measured value obtained in step (b), and (e) fusing the secured portion of the above-mentioned optical transmission member so that the above-mentioned optical transmission member is shifted by the above-mentioned driving mechanism based on the amount of deviation and again fixedly securing thereto.

Here, the optical element refers to a device such as a light emitting device like a semiconductor laser and a light emitting diode and a light receiving device like a photodiode, as well as a device used for accurately positioning a lens coupled to a light emitting device or a light receiving device, or a coupled device of these and an optical transmission member such as a wave-guide path, and for assembling these. And the optical transmission member includes, besides an optical transmission path such as an optical fiber, an optical parts assembly constituted by an isolator or a light converging lens, each of which is coupled to an optical transmission path.

Moreover, the securing process onto the substrate includes, beside the directly securing process onto the substrate, a case in which the securing process is carried out onto the substrate through a securing base or a sub-mount. Furthermore, the secured portion refers to a secured portion on the substrate side when directly secured to the substrate, and also refers to a secured portion on the substrate side of the securing face located between the sub-mount or the securing base and the substrate, in the case when secured to the substrate through the sub-mount or the securing base.

Additionally, the optimal position refers to a position in which, with respect to the coupling degree between the optical element and the optical transmission member, a stable coupling degree is obtained in the vicinity of the maximum point. As shown in FIG. 10B, this point is not necessarily coincident with the maximum point when the output characteristic of the optical element or the like exhibits a two-peak property.

In this manner, by forming the through hole between the optical element secured portion and the optical transmission member secured portion of the substrate, heat, generated upon soldering, is hardly transmitted to the optical element side. Also, it becomes possible to prevent degradation in the optical element due to heat. In otherwords, the heat generated upon soldering is not transmitted to the optical element in the shortest distance because of the presence of the through hole, and it takes longer for the heat to reach the optical element. So that the optical element is less susceptible to the transmitted heat. In contrast, in the case when the optical element generates heat through its operations as in the case of a semiconductor laser chip, the heat is transmitted to the substrate located right below through the sub-mount, and absorbed by the substrate that is maintained at a fixed temperature by a Peltier element and the like. Thereby preventing the temperature of the optical element from becoming unnecessarily high.

Moreover, in the case when positioning processes between the optical element and the light transmission member are carried out by using a measuring device of a light transmission type such as a laser micrometer, light is allowed to pass through the through hole. As a result, not only the positional relationship between the optical element and the optical transmission member in the Y direction, but also the positional relationship thereof in the X direction (see FIG. 1), is properly adjusted with high precision, thereby making it possible to improve the positional precision.

In other words, before the optical transmission member has been fixedly secured by using a soldering material, a laser micrometer is placed in a manner so as to face the through hole by using the laser micrometer. So that parallel light rays, emitted from an output unit of the laser micrometer, are allowed to pass through the through hole to reach the light receiving unit of the laser micrometer. Thus, it becomes possible to also measure the optimal position in the X direction, and after the securing process by the use of the soldering material, the position in the X direction is again measured by using the laser micrometer so that the amount of deviation in the X direction is detected and corrected. Therefore, it is possible to improve the positional precision, and consequently to improve the coupling efficiency.

Moreover, in accordance with the above-mentioned manufacturing method, prior to the securing process with the soldering material, the optimal position of the optical transmission member is measured by the laser micrometer based upon the display of the laser micrometer. Thereby the absolute position of the optical transmission member with respect to the optical element can be recognized. Therefore, even when a positional deviation in the optical transmission member occurs due to heat treatment and the like upon soldering, the absolute amount of the positional deviation is obtained. And then, the secured portion is fused to correct the position of the optical transmission member in the corresponding direction for correction by the amount of deviation based upon the optimal position, and to fixedly secure thereto again the optical transmission member by using soldering.

Thus, it is possible to carry out assembling processes with high precision by conducting a correcting process only once. That is, although, upon securing the optical transmission member, a fine deviation occurs due to heat applied thereto, the deviation is virtually the same with respect to application of the same heat. Therefore, by fixedly securing again the optical transmission member after shifting it based on the same amount of deviation as the first securing process, it is possible to carry out positioning processes with high precision by conducting a correcting process only once, and consequently to improve the coupling efficiency.

Moreover, by repeating the above-mentioned steps (d) to (e) may be further at least once, even in the case of differences existing in heat application history, the correcting processes of two or three times make it possible to carry out a complete positioning operation. So that it may be possible to provide high positional precision with an improved coupling efficiency.

Furthermore, between the above-mentioned steps (b) and (c), a step in which the optical transmission member is shifted by using the driving mechanism based on an amount that is preliminarily predicted as an amount of deviation in the Y direction caused by the securing process of the optical transmission member may be carried out, with the above-mentioned steps (d) to (e) being omitted. Thereby, it becomes possible to carry out assembling processes with high precision without the necessity of carrying out any correcting process.

That is, as described above, although a fine deviation occurs due to heat applied thereto upon securing the optical transmission member, the deviation is virtually the same upon application of the same heat. Therefore, in the case of mass production, the amount of deviation can be predicted to a certain extent. So that, by preliminarily obtaining the predicted amount, the optical transmission member is preliminarily shifted from the optimal position based on the corresponding amount of deviation prior to the securing process with the soldering material, and then fixedly secured thereto. Thus, it is possible to carry out positioning processes with high precision without conducting any correcting process after the securing process, and consequently to improve the coupling efficiency.

Here, the above-mentioned steps may be carried out outside a box member, and after the optical transmission member has been fixedly secured thereto, the substrate including the optical transmission member may be placed and secured in the box member. Thus, even in the case when no space is available in the box member to install a laser micrometer or in the case when the box member does not transmit light rays from the laser micrometer, the positioning and correcting processes are carried out by using the laser micrometer outside the box member, and the resulting substrate can be assembled into the box member so that it becomes possible to provide an optical module with high precision.

Furthermore, by using a substrate having a hole formed therein as the substrate, upon measuring the position in the Y direction, the position in X direction, that is a direction perpendicular to the Y direction and also perpendicular to the surface of the substrate, is also measured, thereby the amount of deviation in the X direction is corrected. Thus, with respect to the X direction also, the correcting process by the use of the laser micrometer is available, so that it is possible to improve the coupling efficiency also in the X direction. In other words, in the case when a semiconductor laser is used as the optical element, since expansion of light in the X direction is small, the coupling efficiency is improved comparatively easily. However, by correcting the amount of deviation also in the X direction, the coupling efficiency is further improved.

Moreover, in the case when the optical transmission member is formed of an optical fiber with plating, by subjecting the optical fiber to a heating treatment prior to the securing process, the deformation caused by application of heat can be stabilized. Thus, it becomes possible to prevent variations in the fiber position due to applied heat upon carrying out the securing process, and consequently to reduce positional deviations.

BRIEF DESCRIPTION OF THE DRAWINGS

FIGS. 5A to 5D are drawings that explain positioning processes of the optical module of the present invention;

FIGS. 7A and 7B are drawings that explain positioning processes of the optical module in accordance with another embodiment of the manufacturing method of the present invention;

FIG. 8 is an explanatory drawing that shows an example of positioning of an optical module in which a through hole is formed in its substrate;

DETAILED DESCRIPTION OF THE INVENTION

Figure 1A:
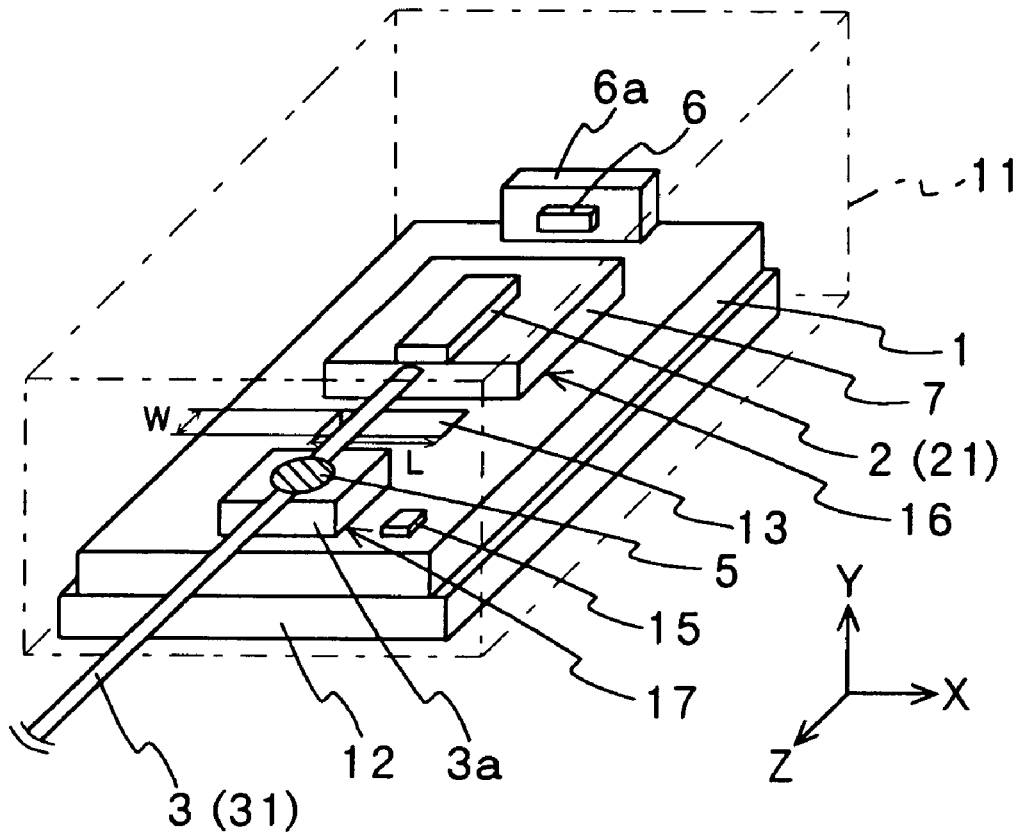
FIGS. 1A and 1B are a perspective view that explains an optical module in accordance with the present invention from which a box member has been removed and a cross-sectional view that explains the optical module which includes the box member thereof.
Figure 1B:
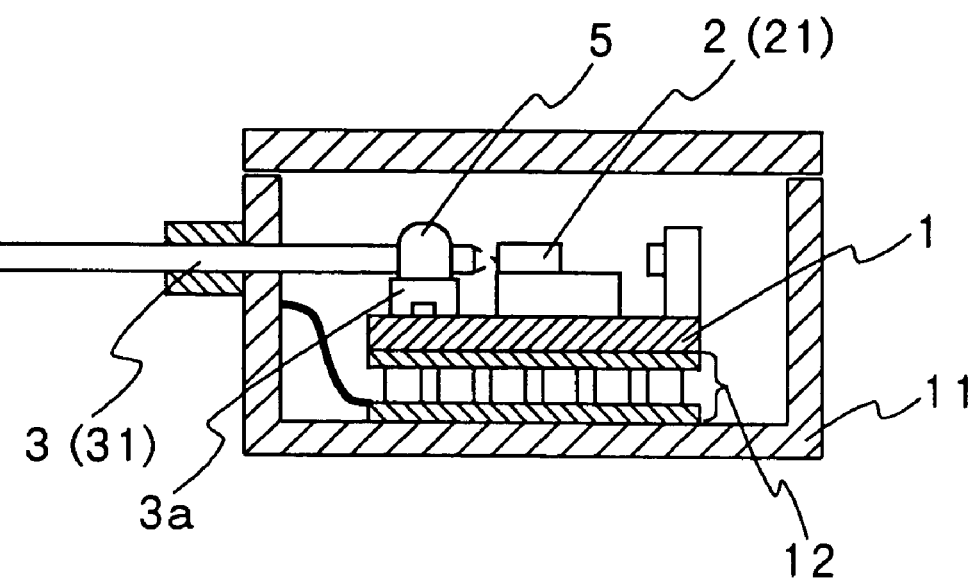

Referring to FIGS. 1A and 1B, the following description will discuss an optical module in accordance with the present invention. FIGS. 1A and 1B show one embodiment of an optical module in accordance with the present invention, and are a perspective view that explains an optical module for use in an exciting light source used for an EDFA or the like, from which a box member has been removed, and a cross-sectional view that shows the entire structure thereof. An optical module in accordance with the present invention has following arrangement.

In which an optical element 2 (a semiconductor laser chip 21 in an example shown in FIG. 1) is fixedly secured to a substrate 1, and an optical transmission member 3 (an optical fiber 31 in the example shown in FIG. 1), which is coupled to the optical element 2, is fixedly secured to the substrate 1. Further, this assembled member is secured to the inside of a box member 11 made of trademark Kovar, Cu—W, or the like through a Peltier element 12, with the optical transmission member 3 being directed from the box member 11. In the example shown in FIG. 1, the optical element 2 and an optical transmission member securing base 3a are fixedly secured onto the substrate 1, and the optical transmission member 3, coupled to the optical element 2, is fixedly secured to the optical transmission member securing base 3a. The present invention is characterized in that the substrate 1 is prepared as a substrate which has a through hole 13 between an optical element secured portion 16 and an optical transmission member secured portion 17.

The substrate 1 is made of an insulating substrate having a through hole 13 between the optical element secured portion 16 and the optical transmission member secured portion 17. Here, in the example shown in FIG. 1, the optical element 2 is fixedly secured to the substrate 1 through a sub-mount 7, and the optical transmission member 3 is fixedly secured thereto through an optical transmission member securing base 3a. Although, the substrate 1 is preferably prepared as a substrate made of AlN, SiC or the like with good thermal conductivity, from the viewpoint of heat radiation, not limited to these materials, the substrate may be formed of $Al_2O_3$ substrate, a quartz substrate or a glass ceramics substrate, each of which has a lower thermal conductivity.

Moreover, the substrate has a size of about 6 mm in the X-direction, about 1 mm in the Y-direction and about 8 mm in the Z-direction. The size of the substrate is not limited by this size. Here, the Z-direction refers to a light-axis direction connecting the optical element 2 to the optical transmission member 3, the Y-direction refers to the direction perpendicular to the face of the substrate 1 to which the optical element 2 is fixedly secured, and the X-direction refers to a direction perpendicular to the Y-direction and Z-direction (see FIG. 1A).

The through hole 13 is formed in a manner so as to penetrate the substrate 1 between the optical element secured portion 16 and the optical transmission member secured portion 17. With this arrangement, for example, when the optical transmission member 3 is secured to the optical transmission member securing base 3a through soldering, it takes longer for the heat to reach the optical element 2. As a result, it is possible to prevent the optical element 2 from a temperature rise and the subsequent degradation in the characteristics of the optical element 2. From this point of view also, the greater the size of the through hole 13, the better, since this makes the heat generated upon soldering more difficult to be transmitted to the optical element 2. But taking the strength of the substrate 1 into consideration, the size is set to a width (W) of about 0.5 mm and a length (L) of not more than 50% of the width of the substrate 1.

Further, as will be described later, the through hole 13 is preferably designed so as to allow parallel light rays having a plane shape, emitted from an emitting portion (output unit) 10a of a laser micrometer, to pass through it upon positioning of the optical transmission member 3 in the X-direction. Thus, the through hole 13 is preferably designed to have the width (W) that allows the parallel light rays to pass through it, with the length (L) being smaller than the width of the beam. This arrangement is desirable in that, upon positioning, the position of the light transmission member 3 is relatively measured based upon the end of the through hole 13 of the substrate 1 serving as a reference.

In addition to a light emitting device such as a semiconductor laser and a light emitting diode, and a light receiving device such as a photodiode, the optical element 2 includes a lens to be coupled to a light emitting device or a light receiving device, or a coupled device of these and a device that is accurately positioned with an optical transmission member such as a wave-guide path. In the example shown in FIG. 1, a semiconductor laser chip 21 is used as the optical element 2, and an InGaAs-based high-output semiconductor laser with a band of 980 nm is used as the EDFA exciting light source.

In general, the optical element 2 is preliminary die-bonded on the sub-mount 7 made of AlN with high thermal conductivity by using a soldering material (not shown), and the sub-mount 7 to which the optical element 2 die-bonded is fixedly secured to a predetermined position on the substrate 1 by using a soldering material such as an Au—Sn alloy (not shown). In this case, the optical element secured portion 16 refers a secured portion on the substrate 1 side between the sub-mount 7 and the substrate 1. Alternately, the sub-mount 7 may be preliminarily fixedly secured onto the substrate 1, and the optical element 2 may be next die-bonded thereon. Further, the optical element 2 maybe fixedly secured onto the substrate 1 directly without using the sub-mount 7, in this case, the optical element secured portion refers a secured portion on the substrate 1 side, located between the optical element 2 and the substrate 1.

Figure 2:
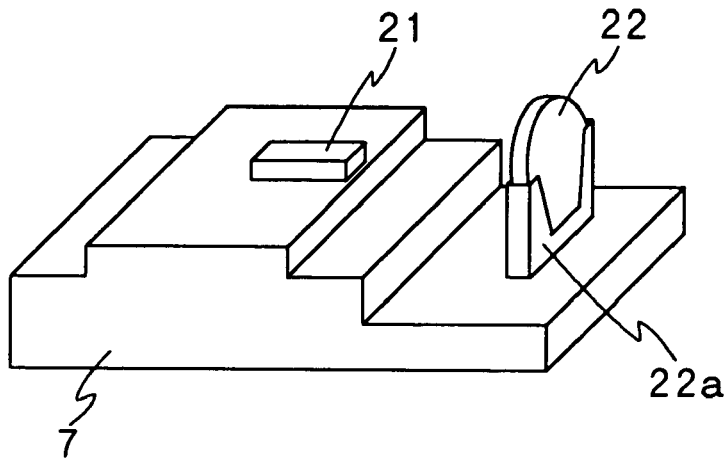
FIG. 2 is an explanatory drawing that shows another example of an optical element of the optical module in accordance with the present invention.

For example, as shown in FIG. 2 as another example of the optical element 2, a coupled member in which a semiconductor laser chip 21 and a lens 22 are integrally coupled may be installed. In this coupled member, the semiconductor laser chip 21 and the lens 22 are provided on the sub-mount 7, and the lens 22 is used for converging light emitted from the semiconductor laser chip 21 into parallel light rays so as to be transmitted to the optical transmission member 3 described below (for example, an optical parts assembled member 32) (see FIG. 3). The application of the lens 22 makes it possible to reduce influences (reduction in output) due to a deviation in the optical transmission member 3. More specifically, as shown in FIG. 2, a lens bracket 22a or the like is provided on the sub-mount 7 through YAG welding or the like, then the semiconductor laser chip 21 is then fixedly secured thereto, and the lens 22 being bonded to the lens bracket 22a through a bonding agent or the like. Thereby, this structure is formed. Here, the lens may be directly formed on the sub-mount 7.

Moreover, the arrangement of the present invention may be applied to a case in which the optical element 2 is employed as a device other than the above-mentioned parts, such as a semiconductor laser with a canned package, a wave-guide path and a coupled member in which a plurality of lenses are combined with a light emitting device such as a semiconductor laser chip 21. Also in these cases, it is possible to provide an accurate positioning process. The present invention is also applied to a case in which a light receiving device such as a photodiode is used in place of the light emitting device. Here, the position-adjusting process between the light receiving device and the optical transmission member is carried out by making the amount of receiving light by the light receiving device greatest, when externally applied light having a given output is incident on the optical transmission member 3. With respect to other operations, the positioning processes may be carried out by using the same method as the light emitting device.

With respect to the sub-mount 7, although a member having good thermal conductivity is preferably used since it easily releases heat, generated from the optical element 2 upon driving the optical element 2, to the substrate 1 side, not limited to this. For example, a sub-mount with an oxide film formed on a silicon substrate may be used, or the semiconductor laser chip 21 may be directly secured onto the substrate 1 without using the sub-mount 7.

Moreover, a light receiving element 6 is provided on the surface of the sub-mount 7 or the substrate 1. The light receiving element 6 may be formed as a built-in part in the sub-mount 7, or independently provided on any portion on the substrate 1 through a light receiving element securing base 6a. In other words, it is placed at any position as long as it allows receipt of one portion of the light emitted from the semiconductor laser chip 21. The light receiving element 6 receives light emitted from the semiconductor laser chip 21 so as to monitor the light output from the semiconductor laser chip 21, and carries out auto-power control driving operations (hereinafter, referred to simply as APC driving) to maintain the light output at a fixed level. Generally, a photodiode made from Si, InGaAs or the like is used.

In addition to an optical transmission path such as an optical fiber 31, the optical transmission member 3 refers to an optical parts assembled member 32 constituted by an isolator, a converging lens and the like that are coupled to the optical transmission path. In the example shown in FIG. 1, an optical fiber 31 made from quartz is placed on the optical transmission member securing base 3a, with its one end passing over the through hole 13 so as to be connected to the optical element 2 through a coupling method as will be described later. In this case, the optical transmission member secured portion 17 refers to a secured portion on the substrate 1 side, located between the optical transmission member securing base 3a and the substrate 1. Moreover, without installing the optical transmission member securing base 3a, the optical transmission member 3 may be directly secured onto the substrate 1, and in this case, it refers to a secured portion on the substrate 1 side, located between the optical transmission member 3 and the substrate 1.

In the case when an optical fiber 31 is used, a fiber with a tip-wedge-shaped lens is preferably used in an attempt to improve the coupling efficiency. In other words, the fiber with a tip-wedge-shaped lens has a spherical-face lens in the Y-direction, and in the case when the semiconductor laser chip 21 is used as the optical element 2, in general, the light emitting angle becomes greater in the Y-direction. So, the application of this fiber prevents a reduction in the coupling efficiency. Moreover, an optical fiber with plating may be used as the optical transmission member 3.

Figure 3:
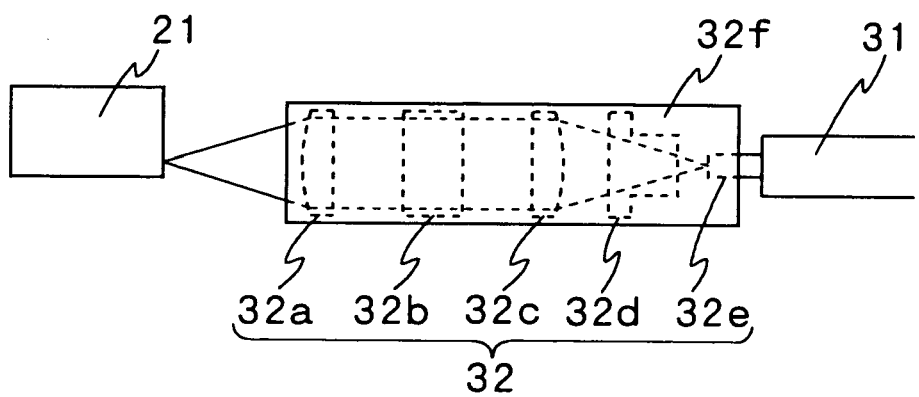
FIG. 3 is an explanatory drawing that shows another example of an optical transmission member of the optical module in accordance with the present invention.

For another example of the optical transmission member 3, the present invention is also applied to a case in which an optical parts assembled member 32 to be connected to an optical fiber is position-adjusted, in the same manner. For example, as shown in FIG. 3, the optical parts assembled member 32 is constituted by a collimate lens 32a, an isolator 32b, a converging lens 32c, a sleeve 32d, a ferrule 32e and the like that are combined into a tube 32f. Light emitted from the optical element 2, is converged, and transmitted to an optical fiber 31 or the like that is connected to one end of the optical parts assembled member 32. In the case of this optical parts assembled member 32 also, since it is covered with the tube 32f that is made of trademark Kovar or Cu—W alloy so as to prevent parallel light rays from a laser micrometer 10 (which will be described later, see FIG. 4) from being transmitted or refracted, the absolute position of the optical parts assembled member 32 can be measured by using the laser micrometer 10 through the same method as the case in which the optical fiber 31 is used as the above-mentioned optical transmission member 3. Thus, it is properly coupled to the semiconductor laser chip 21.

Here, the optical parts assembled member 32 may have an arrangement other than the above-mentioned structure. In other words, it may have the arrangement for transmitting light emitted from the semiconductor laser chip 21, and any arrangement may be used as long as the light of the laser micrometer 10, which will be described later, is not transmitted or refracted. For example, any arrangement having a single lens such as a rod lens made of BK7 (boron silicate crown glass) or quartz is used, as long as the light of the laser micrometer 10 is not transmitted or refracted.

With respect to the optical transmission member securing base 3a, a material having a low heat-radiating property, such as glass ceramics, mullite (mixed material with $Al_2O_3$ and MgO) and quartz, is preferably used. In other words, as will be described later, when the optical fiber 31 or the like is used and fixedly secured to the optical transmission member securing base 3a by using a soldering material 5, a heating process is carried out by using a hot pincette or the like so as to fuse the soldering material 5 and to fixedly secure the optical transmission member 31 thereto. In this case, since heat is also transmitted to the semiconductor laser chip 21 through the optical transmission member securing base 3a and the substrate 1, there is a possibility that the semiconductor laser chip 21 might deteriorate. Therefore, in order to prevent this, a material having a low heat-radiating property is used for the optical transmission member securing base 3a, so that it becomes possible to make the heat, generated upon fusing the soldering material 5, more difficult to be transmitted to the semiconductor laser chip 21 side.

A Peltier element 12 controls the temperature on the substrate 1 by absorbing heat generated upon driving the optical element 2. Generally, it has a structure in which a plurality of thermoelectric elements of p-type and n-type are placed in series with each other electrically, with both of the sides thereof being sandwiched by ceramics substrates. Thus, the controlling process is carried out based upon the temperature monitored by a thermistor 15 on the substrate 1. Here, the thermistor 15 is a resistance member that is sensitive to heat, for example, a heat-sensitive element of a semiconductor formed by sintering a transition metal oxide mainly made of Mo and Co. The temperature detected by the thermistor 15 is monitored, and the temperature of the substrate 1 is controlled to a fixed temperature by using the Peltier element 12 (described later).

Figure 4:
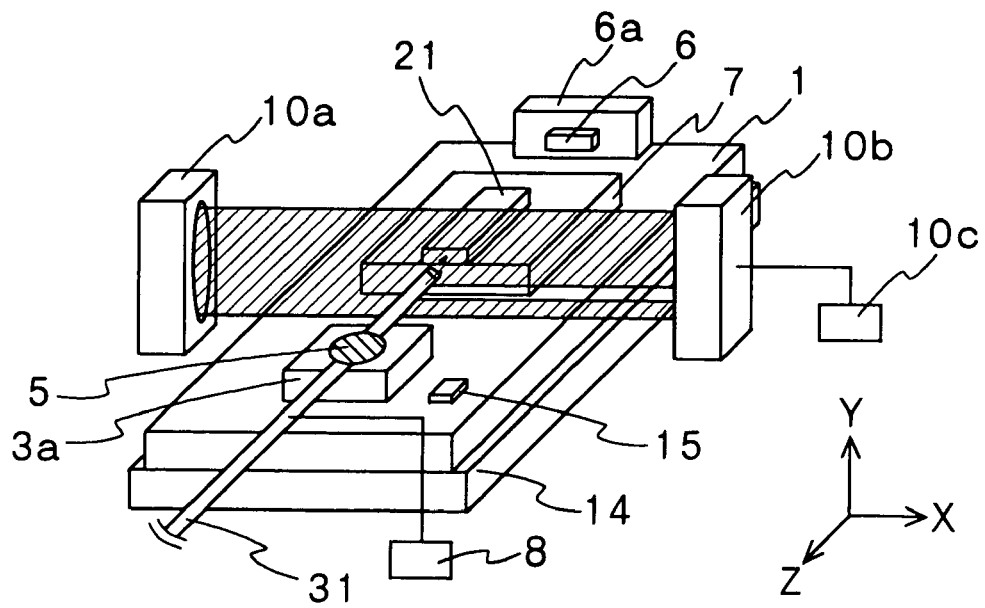
FIG. 4 is a drawing that explains one embodiment of a manufacturing method for the optical module in accordance with the present invention.

Referring to FIG. 4, the following description will discuss a manufacturing method for an optical module of the present invention by exemplifying a case in which no through hole 13 is formed in the substrate. In the manufacturing method of the present invention, in order to improve the coupling efficiency between the optical element 2 and the optical transmission member 3 by using a simple manufacturing process, the optical transmission member (optical fiber 31) is position-adjusted so as to be coupled to the optical element (semiconductor laser chip 21) at an optimal position.

After the position of the optical fiber 31 in the Y-direction that is a direction perpendicular to the surface of the substrate 1 to which it is secured has been measured by laser micrometers 10 (10a, 10b, 10c), the optical fiber 31 is fixedly secured thereto by using a soldering material 5, and this is again measured by the laser micrometer 10 to detect the amount of deviation from the measured value before the securing process. Thus, the secured portion is again fused so that the optical transmission member 3 is again secured thereto with an offset corresponding to the amount of deviation.

In the example shown in FIG. 4 also, the optical transmission member securing base 3a and the thermistor 15 are placed on the substrate 1. Here, in the case when the optical transmission member 3 is directly secured to the substrate 1, the optical transmission member securing base 3a is not necessary.

First, a semiconductor laser chip 21, which is an optical element 2, is fixedly secured to a substrate 1 to which an optical transmission member 3 and the laser chip 21 are to be fixedly secured.

In the process for fixedly securing the semiconductor laser chip 21 onto the substrate 1, a semiconductor laser chip 21 is preliminarily die-bonded to a sub-mount 7 made of a material having good heat conductivity such as AlN, by using a soldering material (not shown). The sub-mount 7 on which the semiconductor laser chip 21 has been die-bonded is fixedly secured onto a predetermined position on the substrate 1 by using a soldering material such as an Au—Sn alloy (not shown). Here, the sub-mount 7 may be preliminarily fixedly secured onto the substrate 1, and the semiconductor laser chip 21 may be then die-bonded thereto.

More specifically, in the example shown in FIG. 4, the following members are fixedly secured on the substrate 1 made of AlN: the optical transmission member securing base 3a made of glass ceramics, the thermistor 15 formed by sintering a transition metal oxide essentially composed of Mn, a light receiving element 6 made from an Si photodiode placed through a light receiving-element securing base 6a, and through the AlN sub-mount 7, an InGaAs-based high output semiconductor laser chip 21 having a band of 980 nm that serves as an optical element 2.

The substrate 1 bearing the semiconductor laser chip 21 and the like assembled thereon is placed on a work bench 14 having a predetermined temperature as shown in FIG. 4, and secured thereon by a driving mechanism 8 such as an XYZ stage that allows fine adjustments of not more than 0.1 μm in the XYZ directions in a manner so as to allow one end of the optical transmission member 3 made of, for example, the optical fiber 31, to face the semiconductor laser chip 21 through the through hole formed in a side wall of the box member 11. Further, the semiconductor laser chip 21 is driven while the optical fiber 31 is shifted by a driving mechanism 8 so as to be position-adjusted and coupled to the semiconductor laser chip 21 at an optimal position.

Here, in the case when the light transmission member 3 is formed of an optical fiber with plating, it is preferable to heat the optical fiber 31 prior to a positioning process, which will be described later, in an attempt to further improve the positional precision. In other words, the inventors have found that, for example, in the case of an optical fiber that is Ni/Au plated, a stress is imposed thereon by plating and upon application of heat, the position of the optical fiber in the Y-direction is deformed by approximately 10 μm. The inventors have also found that by once heating the optical fiber 31, the stress of plating is alleviated so that even a re-heating process hardly causes any deformation. For this reason, in the case when an optical fiber with plating is used, it is preferable to preliminarily heat the optical fiber 31 at approximately 150 to 400° C. for approximately 10 to 60 seconds before a positioning process, more preferably, at approximately 300° C. for approximately 30 seconds, in an attempt to reduce the amount of deviation at the time of a positioning process, which will be described later.

The position adjustments are carried out in the following manner: The optical fiber 31 is placed on the substrate 1, and the semiconductor laser chip 21 is APC-driven. Further, an optical output measuring device (not shown) is placed on the other end of the optical fiber 31. Thus, light is directed into the optical fiber 31 so that the output, transmitted by the optical fiber 31, is monitored and the optical fiber 31 is adjusted in its XY directions by a driving mechanism 8 so as to be placed at an optimal position. Here, the Z-direction is less sensitive to a positional deviation, thus the adjustments may be carried out without using the driving mechanism 8. However, the driving mechanism 8 may be used for the adjustments.

Figure 10A:
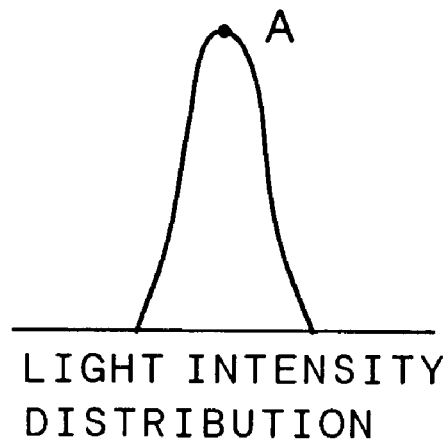
FIGS. 10A and 10B are drawings that explain a light intensity distribution at an optimal position.

Here, the optimal position refers to a position in which a stable coupling degree is obtained in the vicinity of the maximum point between the optical element 2 and the optical transmission member 3. In other words, in the case when the semiconductor laser chip 21 is used as the optical element 2, in general, as shown in FIG. 1A, the light intensity distribution exhibits a single-peak property with respect to the XY directions, with the result that, in most cases, the optimal position coincides with a position having the maximum intensity (point A in FIG. 10A).

Figure 10B:
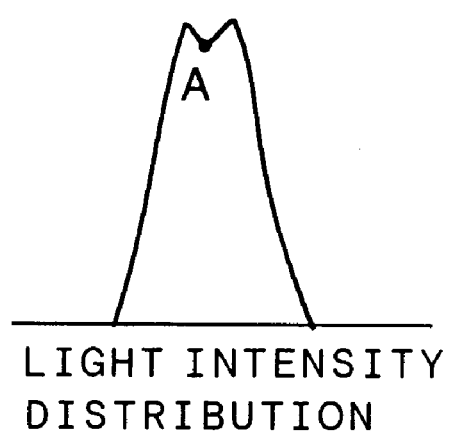

However, as shown in FIG. 10B in the case when the light intensity distribution exhibits a multi-peak property, the optimal position does not necessarily coincide with the position having the maximum intensity. In other words, in the case of the light intensity distribution having a multi-peak property, setting to the position having the greatest light output tends to cause a great reduction in the light output even when the coupling position is slightly offset from the corresponding position, and the subsequent reduction in the yield. Therefore, a position that has a sufficiently high light intensity and is less sensitive to a positional deviation (point A in FIG. 10B) might form an optimal position.

More specifically, for example, the substrate 1 is placed on a Peltier element that serves as the working bench 14, and the optical fiber 31 thus secured is held on the optical transmission member securing base 3a by the driving mechanism 8. So that, the position of the leading end of the optical fiber 31 is adjusted while the semiconductor laser chip 21 is being APC-driven at approximately 300 mW. With respect to the Z direction, the leading end of the optical fiber 31 is set in a position separated from the vicinity of the light emitting point of the semiconductor laser chip 21 by approximately 10 μm, and with respect to the X direction and the Y direction, it is adjusted to approximate positions corresponding to the position of the light emitting point by the driving mechanism 8.

And, the light output measuring device is connected to the rear of the optical fiber 31 so that the light output transmitted through the optical fiber 31 is monitored so that the X direction and Y direction are adjusted so that the fiber output is obtained in a certain degree. After the Z direction has been re-adjusted to an optimal position with a distance of several μm from the vicinity of the light emitting point, the X direction and Y direction are finely re-adjusted to optimal positions by the driving mechanism 8.

Then, in the adjusted state to the optimal positions, the absolute position in the Y direction is measured by using the laser micrometer 10.

The laser micrometer 10, which refers to a non-contact laser length-measuring sensor with high precision capable of dimension controls with high precision, is constituted by an output unit 10a which allows a polygon mirror rotating at a high speed to reflect a laser beam emitted from a laser oscillator to form parallel light rays through a collimator lens, a light receiving unit 10b that collects the parallel light rays to a light receiving element through a converging lens, and in this arrangement, a process controlling unit 10c which converts the light received in the light receiving unit to the corresponding dimension and displays the dimension.

So that the parallel light rays emitted from the output unit 10a, scan a measuring object at high speeds, and are received by the light receiving unit 10b. Thus, in accordance with bright and dark portions formed by being shielded by the measuring object, the resulting pattern is displayed by the process controlling unit 10c as the corresponding dimension and the resolution is set to approximately 0.02 μm with measuring precision being set to approximately 0.1 μm.

By using this laser micrometer 10, the absolute value of the amount of deviation after the securing process by the soldering material 5 can be detected, and it becomes possible to carry out an accurate positioning operation without the necessity of re-detecting the relative position to the optical element 2 upon carrying out correction.

More specifically, as shown in FIG. 4, the laser micrometer 10 is placed at such a position that the position in the Y direction can be measured, and parallel light rays, emitted from the output unit 10a, are allowed to pass through the optical fiber 31, and made incident on the light receiving unit 10b. Further, in the process controlling unit 10c, light rays, shielded by the optical fiber 31, are displayed as dark portions, so that the absolute position of the optical fiber 31 is detected and stored.

Next, the optical fiber 31, which has been position-adjusted, is fixedly secured to the optical transmission member securing base 3a by a soldering material 5. Here, as described earlier, the optical fiber 31 may be directly secured onto the substrate.

The securing processes by the soldering material 5 are carried out as follows: The soldering material 5 is set around the optical fiber 31, and a heating process is carried out by using a heating jig 9 (see FIGS. 5A to 5D) such as a hot pincette, so that the soldering material 5 is fused, and this is then cooled down. The heating process is carried out by heating the soldering material 5 up to its melting temperature. In this case, the lower the heating temperature and the shorter the heating time, the better, since the semiconductor laser chip 21 is less susceptible to damage. Moreover, it is preferable to use the hot pincette as the heating jig 9, since a pulse heating process is available and since a quick heating process is carried out in a short period of time. Here, with respect to the soldering material 5, for example, an Au—Sn alloy, an Sn—Pb alloy, In or the like may be used, although not particularly limited by these materials.

Different from the securing process through welding by using a YAG laser, the application of the soldering material 5 makes it possible to easily release the secured portion, and also to re-secure the portion. In other words, in the case when the securing process is carried out by the YAG laser, upon occurrence of a positional deviation, it is difficult to correct the deviation, and the precision is poor with limited readjustments. In contrast, the application of the soldering material 5 makes it possible to carry out correcting processes as many times as desired.

More specifically, as shown in FIG. 5A, a pulse heating process is carried out by using the hot pincette 9 at 300° C. for approximately 10 seconds so that an Au—Sn alloy (containing about 80 atomic % of Au) serving as the soldering material 5 is fused. Thereafter, the heating process with the hot pincette 9 is stopped so that the soldering material 5 is cooled until it has been solidified.

Next, after the securing process by the soldering material 5, the position of the optical fiber 31 in the Y direction is measured by the laser micrometer 10 so that an amount of deviation from the value stored as the optimal position is detected.

More specifically, as shown in FIG. 5B, after the soldering material 5 has been solidified, the laser micrometer 10 is used to measure the absolute position of the optical fiber 31 in the Y direction, so that the process controlling unit 10c detects an amount of deviation Δd. This process is carried out to measure the amount of a positional deviation in the optical fiber 31 previously adjusted to an optimal position due to a heating process and the like upon solder-joining process.

Then, as shown in FIG. 5C, the secured portion of the optical fiber 31 is fused and the optical fiber 31 is shifted by the driving mechanism 8 based on the amount of deviation Δd in the Y direction that has been detected, and re-secured thereon. The re-securing process also causes a deviation by the first amount of deviation Δd, with the result that, as shown in FIG. 5D, the optical fiber 31 is fixedly secured in the vicinity of the optimal position.

More specifically, the substrate 1 is again heated at about 300° C. for approximately 10 seconds, so that the secured portion of the soldering material 5 is fused, and the optical fiber 31 is further shifted by the driving mechanism 8 from the former position by the amount of deviation Δd, and after the shift, this is again cooled off.

As described earlier, since the amount of deviation due to deformation upon application of heat appears in the same manner also in the case of a re-heating process for correction, the positioning process is carried out with high precision by making a shift by the amount of deviation. However, in some cases, no reproducibility exists in heat history, so that even the application of the same temperature causes a slightly different amount of deviation due to the re-heating process. In this case, by repeating the correction at least one time or more, it becomes possible to provide high yield with higher precision.

In other words, the following processes are repeated at least one time or more: by measuring the position of the optical fiber 31 in the Y direction using the laser micrometer 10, the amount of deviation Δd is detected, and the secured portion of the optical fiber 31 is fused, then the optical fiber 31 is shifted by the driving mechanism 8 based on the amount of deviation that has been detected, and re-secured thereon. Thus, the amount of deviation Δd is reduced and only great amounts of deviation Δd can be again corrected, so that it is possible to increase the yield. More specifically, processes shown in FIGS. 5A to 5C are again repeated so as to correct the amount of deviation Δd.

Lastly, as shown in FIG. 1B, the substrate 1 bearing the optical fiber 31 and the semiconductor laser chip 21 is assembled on the Peltier element 12 in the box member 11, and the box member 11 is closed by a lid and sealed in a nitrogen atmosphere. Here, in place of assembling in the box member 11 after the positioning and securing processes in this manner, the above-mentioned positioning process may be carried out, after the assembling process into the box member 11 preliminarily conducted. However, in the case when the box member 11 is made of a material that does not transmit parallel light rays from the laser micrometer 10, the measuring process cannot be carried out by the laser micrometer 10 when the substrate 1 is preliminarily assembled into the box member 11. Therefore, the assembling process into the box member 11 is preferably carried out after the positioning process.

Here, in the case when the box member 11 is allowed to transmit light rays from the laser micrometer 10, or in the case when there is a space to accommodate the laser micrometer 10 in the box member 11, the positioning process may be carried out after the assembling process without problems.

As described above, in the conventional device, even in the case when the positioning process is carried out, a positional deviation actually occurs at the time of a securing process of the optical fiber that is carried out after the positioning process, and the correcting process of the deviation is required. But, in the case when the optical fiber is secured through welding by a YAG laser, it is difficult to carry out corrections of a plurality of times. On the other hand, in the case when it is secured by using a soldering material so as to carry out corrections, a positional deviation occurs due to a heating process and the like upon fusing the soldering material, and since the direction of the deviation in the optical fiber and the absolute amount thereof are not recognized, it is not possible to carry out a complete positioning process.

In the present invention, the application of the laser micrometer makes it possible to first determine the absolute position that is optimal, and after the securing process by a soldering material, the amount of deviation from the optimal position can be detected, therefore it becomes possible to easily correct the amount of deviation in a short period of time, and consequently to provide a high coupling efficiency with high precision.

Figure 6A:
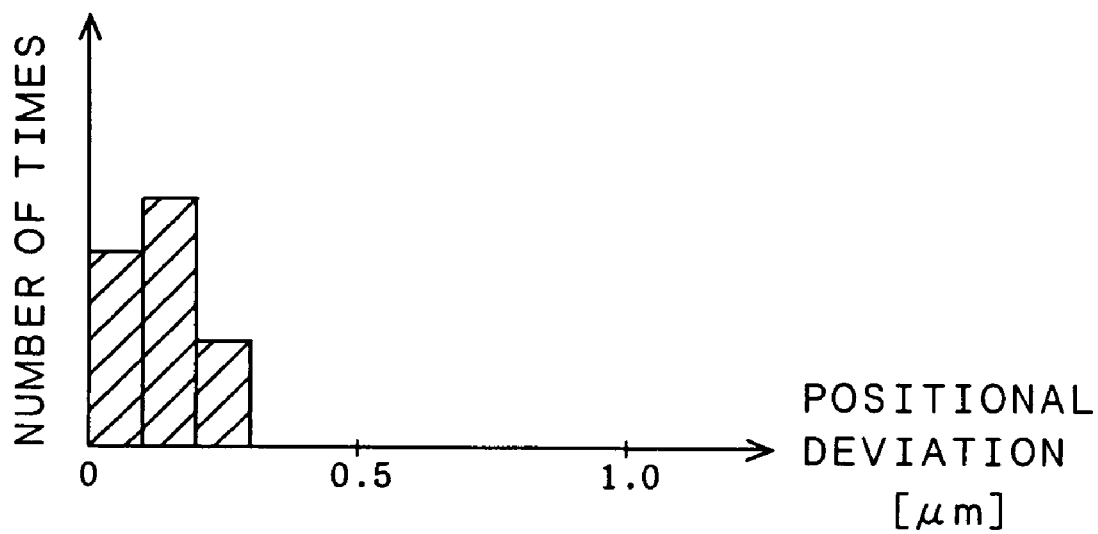
FIGS. 6A and 6B are explanatory drawings that show the amount of positional deviation of the optical module of the manufacturing method of the present invention.
Figure 6B:
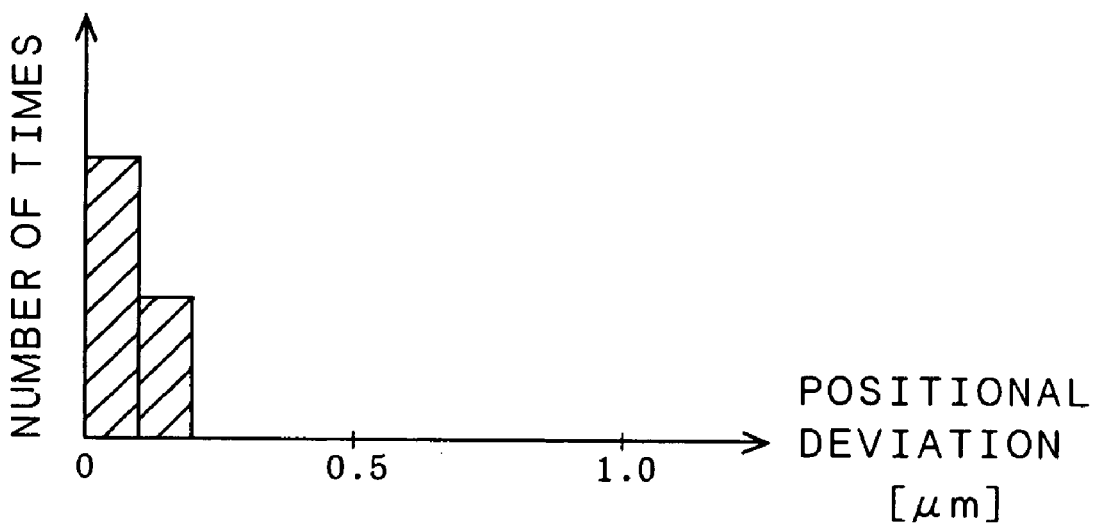
Figure 11A:
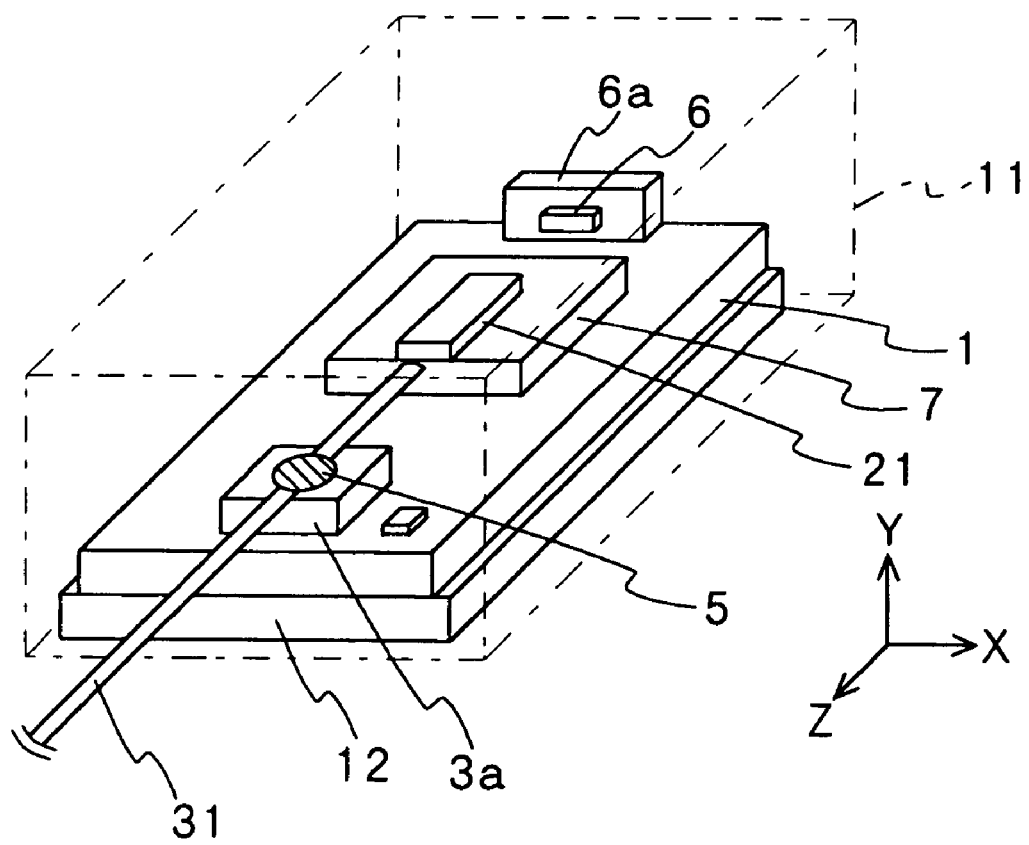
FIGS. 11A to 11C are drawings that explain the structure, positioning process and amount of positional deviation of a conventional optical module.
Figure 11B:
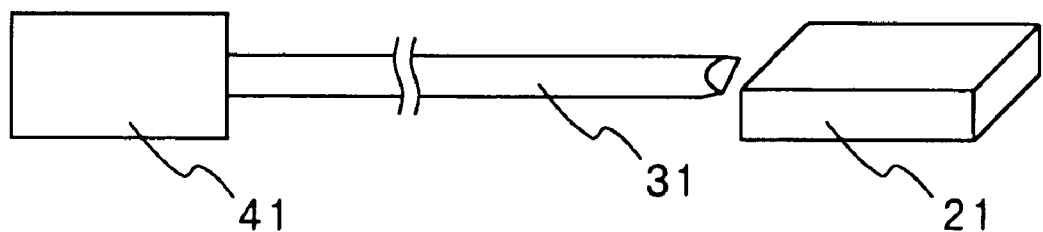
Figure 11C:
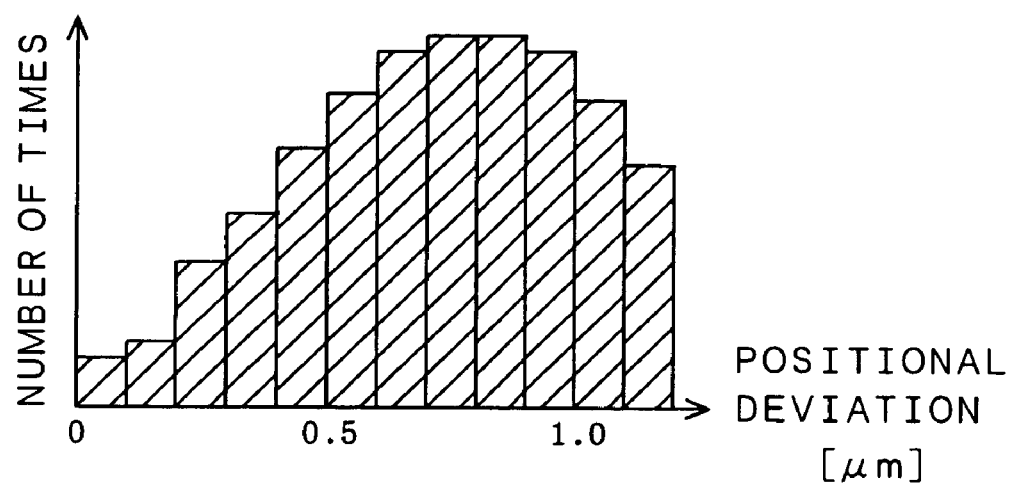

As a result, in the case of a conventional securing process through welding by a YAG laser, a deviation of about 0.7 μm in average has occurred (see FIG. 11C). In contrast, in the present invention, as shown in FIG. 6A, the deviation is reduced to about 0.2 μm in average, so that the coupling efficiency is improved with high yield. As shown in FIG. 6B, by further repeating the correction of the positional deviation one more time, the deviation is further reduced to about 0.1 μm in average. Here, the axis of ordinates represents the number of times.

Moreover, as shown in FIGS. 7A and 7B, another manufacturing method is proposed in which: the position in the Y direction of the optical fiber 31 that has been position-adjusted has been first measured by the laser micrometer 10, and after having been shifted based on an amount $\Delta d_1$ that is a predicted amount of deviation due to the securing process of the optical fiber 31 by using the driving mechanism 8, the optical fiber 31 may be fixedly secured thereto by using a soldering member 5.

In other words, upon fixedly securing the optical fiber 31, a slight deviation occurs due to the applied heat, and the amount of the deviation is virtually the same with respect to the application of the same amount of heat to the same type of the optical transmission member. Therefore, the amount of deviation $\Delta d_1$ can be predicted to a certain extent, so that the predicted amount is preliminarily obtained, and prior to the securing process with the soldering material 5, the optical fiber 31 is shifted by the driving mechanism 8 based on the corresponding amount of deviation so that the securing process is carried out at a position that is shifted from the optimal position (see FIG. 7A). Thus, after the securing process, the optical fiber 31 is fixedly secured onto the optimal position (see FIG. 7B), so that the re-securing process that is carried out by again fusing the soldering material 5 can be omitted, thereby simplifying the processes.

Moreover, even in the case of the securing process after shifting based on the amount of predicted deviation $\Delta d_1$, the amount of predicted deviation might vary slightly, and in such a case, after having been secured with the soldering material 5, the position in the Y direction of the optical fiber 31 is measured by the laser micrometer 10, the deviation $\Delta d$ from a value stored as the optimal position is detected, and the optical fiber 31 is again fixedly secured by fusing the secured portion after having been shifted by the driving mechanism 8 based on the detected amount of deviation $\Delta d$ in the Y direction. Thus, by repeating these processes at least one or more times, the amount of deviation is made further smaller, and only great amounts of deviation can be again corrected so that it is possible to provide higher yield with high precision.

Moreover, with respect to a problem of a positional deviation caused by a stress from a plated portion of the optical fiber 31 that is one of the reasons of positional deviations, by subjecting the optical fiber 31 to a heating treatment prior to the positioning process, the positional deviation can be reduced and the necessity for correction is also reduced. So that, the positioning process between the optical fiber 31 and the semiconductor laser chip 21 can be carried out with high precision.

In the above-mentioned example, the position adjustments only in the Y direction have been carried out. In the case of the application of the semiconductor laser chip 21 as the optical element 2, since expansion of light in the X direction is small, a positional deviation in this direction is less occurs. However, by adjusting the deviation in the X direction in the same manner, the coupling efficiency is further improved. FIG. 8 shows this example.

In other words, the X direction is a direction that is perpendicular to the Y direction, and also perpendicular to the light-axis direction in line with the optical transmission member 3 and the optical element 2. Therefore, in the case when the amount of deviation is detected by using a measuring device of a light transmission type such as a laser micrometer 10, if the substrate 1 is not a light-transmitting substrate, then parallel light rays, emitted from the laser micrometer 10 are reflected by the substrate 1. As the result, it is not possible to carry out the detection. However, as shown in the above-mentioned FIG. 1, by using a substrate having a hole 13 formed therein as the substrate 1, the deviation in the X direction is also corrected. In other words, as shown in FIG. 8, the laser micrometers 10 (10*d*, 10*e*, 10*c*) are placed in a manner so as to sandwich the hole 13 so that the parallel light rays from the laser micrometer output unit 10*d* are applied to the optical fiber 31, and the light receiving unit 10*e* is allowed to receive the resulting light. Thus, the position of the optical fiber 31 in the X direction can be measured. Here, it is also necessary to form a through hole in the work bench 14 at a portion corresponding to the through hole 13 of the substrate 1.

The measuring method and the like are carried out in the same manner as those of the Y direction. Moreover, the hole 13 is formed in a manner so as to penetrate the substrate 1 between the position of which the optical element 2 is fixedly secured and the position at which the optical transmission member 3 is fixed. The greater the hole 13, the better since it becomes difficult for heat, generated upon the above-mentioned soldering process, to be transmitted to the optical element 2 side. However, when strength of the substrate 1 is taken into consideration, the size of the hole is set to a width of about 0.5 mm and a length of not more than 50% of the width of the substrate 1.

In accordance with this example, because of the through hole is formed in the substrate, also in the position adjustment in the X direction of the optical transmission member 3 such as an optical fiber 31, the optimal position is first determined by using the laser micrometer, after the securing process with a soldering material, the amount of deviation from the optimal position can be detected. In other words, by using the substrate having a through hole formed therein between the optical transmission member and the optical element, light rays, emitted from the laser micrometer output unit 10*d*, are allowed to pass through the through hole 13 to reach the laser micrometer receiving unit 10*e*, as shown in FIG. 8, while recognizing the position of the optical transmission member 3. Thus, it is possible to accurately measure the optimal position in the X direction and its amount of deviation, and consequently to improve the coupling efficiency between the optical element and the optical transmission member.

Moreover, the formation of this through hole makes the heat generated upon soldering difficult to reach the optical element, and heat, generated from the optical element upon operation, is absorbed by a Peltier element or the like placed right below the substrate so that it is possible to prevent a temperature rise.

In this manner, the application of the laser micrometer 10 makes it possible to detect the absolute value of the amount of deviation after the securing process with the soldering material 5, and upon correction, it is possible to carry out an accurate positioning process without the necessity of re-detecting the relative position to the optical element 2. For example, as shown in FIG. 8, in the measurements in the X direction, the output unit 10*d* and the light receiving unit 10*e* of the laser micrometer 10 are placed in the Y direction in a manner so as to face the through hole 13, and the parallel light rays, emitted from the output unit 10*d*, are allowed to pass through the through hole 13 to reach the light receiving unit 10*e*, so that the dimension in the X direction is measured by the process controlling unit 10*c*. In the same manner, with respect to the Y direction, the laser micrometers 10 (10*a*, 10*b*, 10*c*) are placed in the X direction, so that the dimension in the Y direction is measured.

Figure 9A:
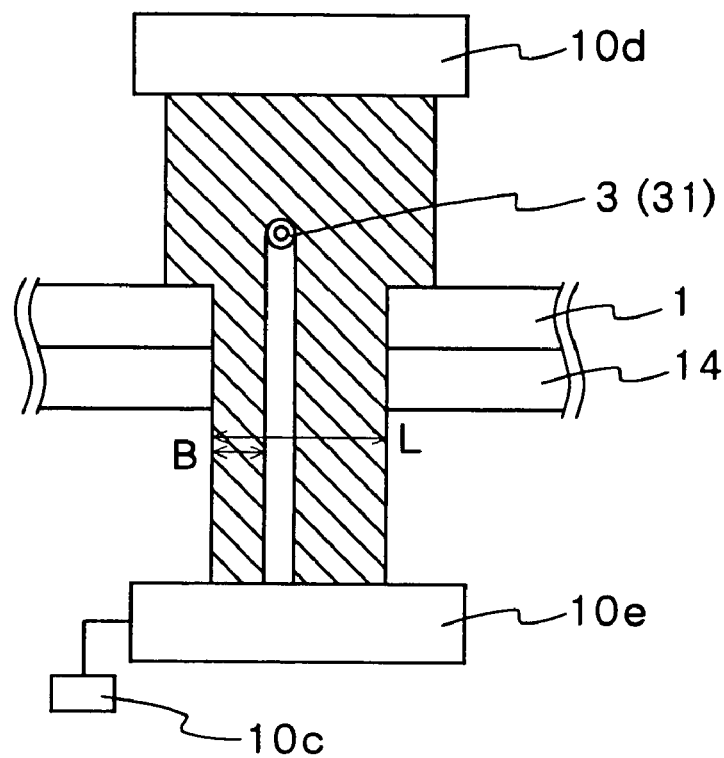
FIGS. 9A and 9B are drawings that explain a method for measuring the relative position of the optical transmission member.

Moreover, with respect to the measurements of the absolute position in the X direction, for example, as shown in a cross-sectional view of the substrate of FIG. 9A (a cross-sectional view taken along S-S direction of FIG. 8, which mainly shows the laser micrometers 10d, 10e), parallel light rays having a width wider than the width (L) of the through hole of the substrate are emitted from the output unit 10d, and in the light receiving unit 10e, a shadowed portion of the substrate 1 and a shadowed portion of the optical fiber 31 are not allowed to receive light rays. As s result, the relative position of the optical fiber 31 (distance B in FIG. 9A) can be measured based upon ends of the through hole 13.

Figure 9B:
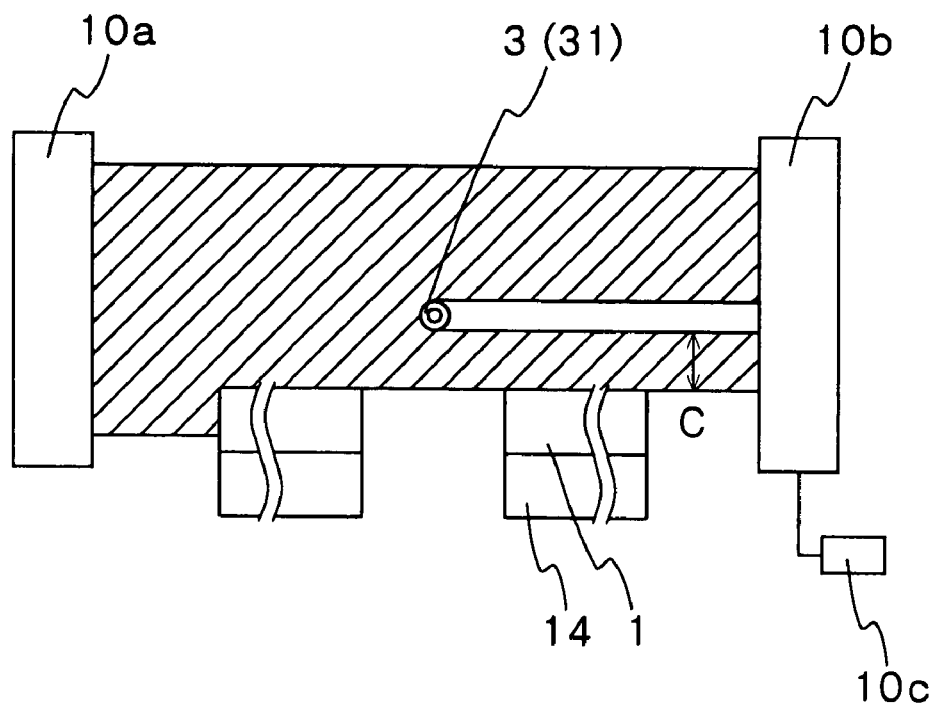

Additionally, the measurements may be carried out based upon ends of the beam width of the laser micrometer 10. However, since even a slight movement of the laser micrometer 10 causes an error in the measured value, it is preferable to measure the position (B) based upon the ends of the through hole described above, or the like. Here, with respect to the Y direction also, as shown in a cross-sectional view of the substrate of FIG. 9B (a cross-sectional view taken along S-S direction of FIG. 8, which mainly shows the laser micrometers 10a, 10b), distance C may be measured based upon the surface of the substrate 1.

In the above-mentioned respective embodiments, for example, the semiconductor laser chip 21 is used as the optical element 2, and the optical fiber 31 is used as the optical transmission member 3. However, not limited to these, also in the case when the above-mentioned other optical element and optical transmission member are used, the present invention makes it possible to prevent degradation in the optical element due to heat, and also to carry out an accurate positioning process.

In accordance with the optical module of the present invention, the substrate has a through hole formed between an optical element secured portion and an optical transmission member secured portion. Therefore, it is possible to prevent degradation in the optical element due to heat generated upon soldering, and also to carry out accurate adjustments between the optical element and the optical transmission member with high precision by using a reduced number of processes, not only in the Y direction but also in the X direction at the time of the assembling operation. Thus, it becomes possible to provide an optical module having high properties with high reliability at low costs.

Moreover, in accordance with the manufacturing method of the present invention, before an optical transmission member has been fixedly secured by using a soldering material on a substrate on which the optical element and the optical transmission member are fixedly secured, the optimal position is measured by a laser micrometer, and after the securing process with the soldering material, the position of the optical transmission member is again detected, so that a correcting process of the amount of deviation is carried out. Thus, the positional relationship between the optical element and the optimal transmission member can be adjusted with high precision, so that it becomes possible to provide an optical module with high precision and high yield at low costs.

Although preferred examples have been described in some detail it is to be understood that certain changes can be made by those skilled in the art without departing from the spirit and scope of the invention as defined by the appended claims.

What is claimed is:

1. An optical module, comprising:
   a substrate;
   an optical element that is fixedly secured to said substrate; and
   an optical transmission member that is coupled to said optical element and fixedly secured on said substrate,
   wherein said substrate is made of a substrate having a through hole between a secured portion of said optical element and a secured portion of said optical transmission member, and said through hole is set to have a distance W in a direction in which the secured portion of said optical element is connected to the secured portion of said optical transmission member, so as to allow parallel light rays having a plane shape, emitted from a laser micrometer, to pass through, and a length L in a direction perpendicular to said distance W is smaller than a width of said parallel light rays.

2. The optical module according to claim 1, wherein the length L of said through hole is set to not more than 50% of the width of said substrate that is a dimension in the length direction of said through hole.

3. The optical module according to claim 1, wherein said substrate is made of AlN or SiC.

4. The optical module according to claim 1, wherein said optical element is at least one member selected from the group consisting of a light emitting device, a light receiving device, a lens that is coupled to a light emitting device or a light receiving device, a coupled device between a light emitting device or a light receiving device and a lens, and a light-guide path.

5. The optical module according to claim 1, wherein said optical transmission member is made of an optical transmission path or an optical parts assembled member to be coupled to an optical transmission path.

6. The optical module according to claim 5, wherein said optical parts assembled member is at least one member selected from the group consisting of an assembled member having a collimator lens, an isolator, a light converging lens and a sleeve that are combined into a tube, a combined member of an isolator and a converging lens, and a rod lens.

7. The optical module according to claim 1, wherein said optical transmission member is fixedly secured onto said substrate through an optical transmission member securing base made of glass ceramics, mullite or quartz.

8. The optical module according to claim 1, wherein said optical element is formed of a semiconductor laser chip, and said optical transmission member is formed of an optical fiber.

9. The optical module according to claim 8, wherein said optical fiber is a fiber with a tip-wedge-shaped lens.

* * * * *